Patented Nov. 17, 1925.

1,561,956

UNITED STATES PATENT OFFICE.

WILLIAM G. THOMAS, OF SOUTH ORANGE, NEW JERSEY, ASSIGNOR TO H. H. THOMAS, OF SUMMIT, NEW JERSEY.

MANUFACTURE OF CORES.

No Drawing.   Application filed October 6, 1923.   Serial No. 667,083.

*To all whom it may concern:*

Be it known that I, WILLIAM G. THOMAS, a citizen of the United States, and a resident of South Orange, county of Essex, New Jersey, have invented certain new and useful Improvements in the Manufacture of Cores, of which the following is a specification.

My invention relates to the manufacture of cores to be used in making castings, and is based on my discoveries that cores having very desirable qualities can be made by binding sand with a relatively small quantity of asphalt, and that such binding action can be accomplished by the use of emulsified asphalt.

A number of different methods of emulsifying asphalt are known, but for purposes of illustration I refer to an emulsion made by mixing a suspension of clay in water with melted asphalt under conditions which will keep the resulting product wet to about the consistency of thick mud.

For making cores this emulsion is diluted with water to about the consistency of cream and then mixed with fine sand to give a moist product adapted to be shaped in the usual manner. After the cores have been formed they are baked for a number of hours at a temperature sufficient to dry out the water and soften the asphalt, so that the sand is thoroughly bound together. Cores thus formed have adequate strength for use in molding and have the advantage over ordinary cores that the molten metal cokes the asphalt so that when the metal is hardened it is found that the core will crumble quite readily and can be easily removed from the casting.

It is within the spirit of my invention to use asphalt prepared in various ways, and if desired, other ingredients such as linseed oil and graphite may be mixed in small percentages with the asphalt.

What I claim is:

1. A core compound comprising sand, emulsified asphalt and water.

2. A core compound comprising sand, water and asphalt emulsified with clay.

3. In the art of making cores, the steps of mixing together sand and emulsified asphalt and bringing the mixture to the desired consistency with water.

WILLIAM G. THOMAS.